July 25, 1961 N. I. WICK 2,993,709
ADJUSTABLE BICYCLE FRAME
Filed Nov. 24, 1959 2 Sheets-Sheet 1
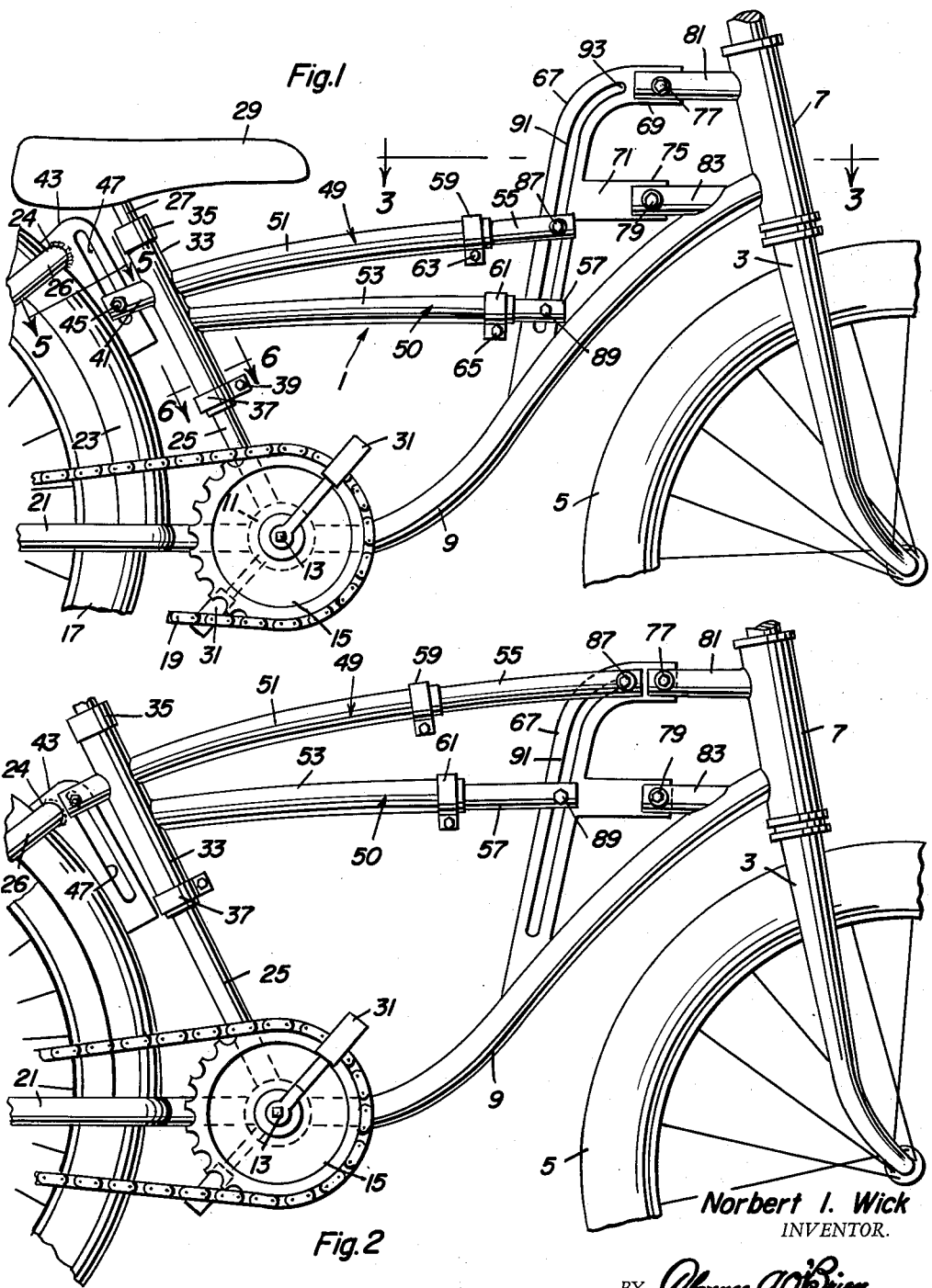
Norbert I. Wick
INVENTOR.

July 25, 1961 N. I. WICK 2,993,709
ADJUSTABLE BICYCLE FRAME
Filed Nov. 24, 1959 2 Sheets-Sheet 2
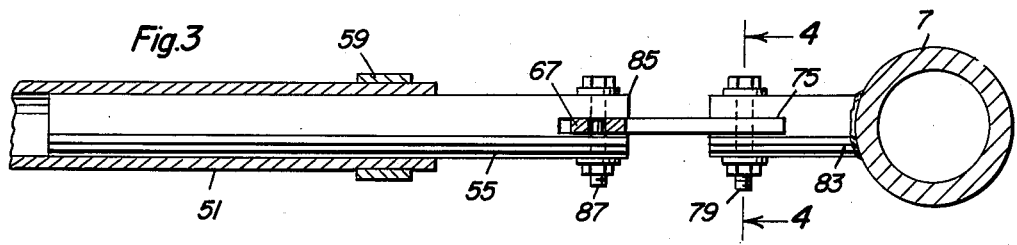
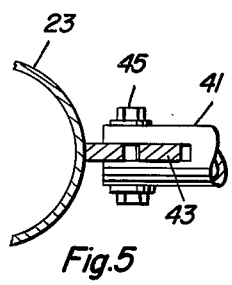
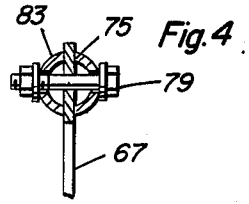
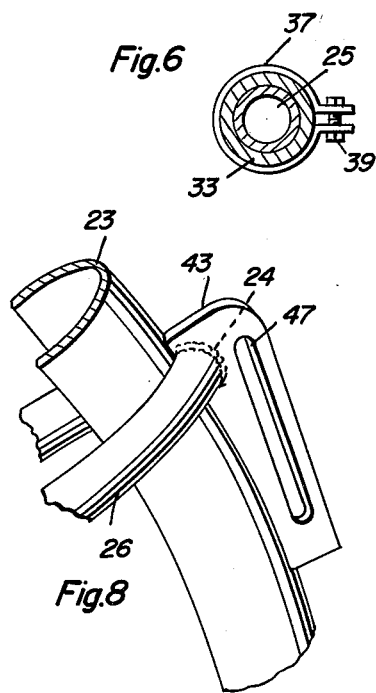
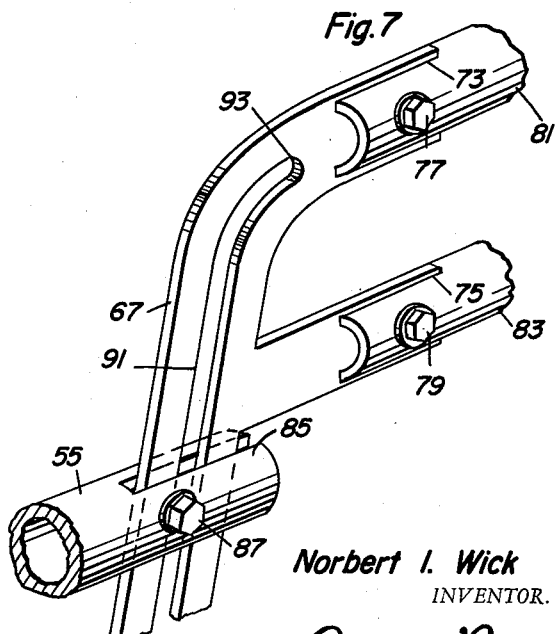
Norbert I. Wick
INVENTOR.

United States Patent Office 2,993,709
Patented July 25, 1961

2,993,709
ADJUSTABLE BICYCLE FRAME
Norbert I. Wick, 926 6th St., Kiel, Wis.
Filed Nov. 24, 1959, Ser. No. 855,078
8 Claims. (Cl. 280—287)

This invention relates to improvements in adjustable bicycle frames.

The primary object of the invention is to provide a bicycle frame which is adjustable to vary the height thereof and of the seat so that adults with long or short legs and children can conveniently pedal a full size bicycle.

Another object is to provide a bicycle according to the foregoing which is stronger than the conventional bicycle as regards the frame, without materially increasing its weight.

Still another object is to provide a bicycle frame which is adapted for adjustment to adjust the seat within a wider range of adjustments than can be obtained in present-day bicycles.

Yet another object is to provide a bicycle frame in accordance with the foregoing which is safe, easy to adjust as regards height and may be manufactured at a comparatively low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary view in side elevation of a bicycle having a frame constructed in accordance with this invention and adjusted to reduce the height thereof;

FIGURE 2 is a similar view with the frame adjusted to increase the height thereof;

FIGURE 3 is a fragmentary enlarged view in horizontal section taken on the line 3—3 of FIGURE 1;

FIGURE 4 is a fragmentary view in vertical section taken on the line 4—4 of FIGURE 3;

FIGURE 5 is an enlarged fragmentary view in cross section taken on the line 5—5 of FIGURE 1;

FIGURE 6 is an enlarged view in cross section taken on the line 6—6 of FIGURE 1;

FIGURE 7 is an enlarged view in perspective partly in section of guide and brace means for a pair of top members of the frame, and FIGURE 8 is an enlarged view in perspective partly in section of the rear wheel fender and a guide plate thereon.

Referring to the drawings by numerals, 1 designates generally a bicycle frame embodying the improvements according to this invention. The frame 1 is of the usual type in that it includes such conventional parts as the front fork 3 for the front wheel 5 journaled in the tubular upright front sleeve or head 7, the lower tubular frame member 9 curving downwardly and rearwardly from the lower end of the front sleeve 7 to the housing 11, shown in broken lines, in which is journaled the pedal shaft 13 with the sprocket wheel 15 thereon for driving the rear wheel 17 by the sprocket chain 19, the lower rear wheel fork 21 extending rearwardly from the housing 11, the rear wheel fender 23 rising from said fork 21 in front of the rear wheel 17, and the tubular seat supporting member 25 inclining upwardly and rearwardly in front of the fender 23 from the housing 11.

Coming now to the improvements, according to this invention, the tubular seat supporting member 25 is shorter than the conventional one and the seat post 27 for the seat 29 is mounted by means, presently described, for adjustment on said rear member 25 longitudinally thereof obliquely, upwardly and downwardly throughout a wide range of adjustments to raise and lower the seat 29 and at the same time move said seat relative to the pedals 31, so that riders of different ages with long or short legs may easily reach and operate the pedals.

The mounting means for the seat post 27 comprises an upright tubular sleeve 33 of resilient metal rising from the rear member 25 and slidable upwardly and downwardly thereon into different adjusted positions with the seat post 27 suitably secured in the upper end of said sleeve 33 by a suitable clamping nut 35 on the upper end of the sleeve 33 for tightly clamping said upper end to the seat post 27. A split band clamp 37 on the lower end of the sleeve 33 with a tightening bolt 39 therein provides for clamping said sleeve to said rear member 25 in different adjusted positions of said sleeve 33.

A tubular bifurcated stud 41 on the sleeve 33 extends rearwardly therefrom in straddling relation to a front upright guide plate 43 resting on the front of the fender 23 and welded, as at 24, to the fender bracing front fork 26, and said stud 41 is slidably secured to the plate 43 by a bolt 45 extending through said stud 41 and an elongated slot 47 in said plate parallel with the sleeve 33 and rear member 25, and whereby means is provided for bracing said sleeve 33 in the rear thereof in the different adjusted positions of said sleeve to the rear wheel fender structure and against binding during adjustment of said sleeve.

A pair of upper and lower, forwardly diverging, top members 49, 50, respectively, are provided for adjustment upwardly and downwardly in unison with the sleeve 33 to vary the height of a major portion of the frame 1 forwardly of the seat 29 in accordance with variations in the height of the seat 29 from the pedals 31 and ground.

The upper and lower members 49, 50 are telescopic and comprise tubular rear sections 51, 53 of resilient metal respectively, terminally integrally formed on the sleeve 33 in forwardly extending position, and front sections 55, 57 respectively, projecting forwardly out of the rear sections 51, 53 and slidable therein, whereby said members 49, 50 are telescopically extensible and contractible for a purpose presently seen. Split clamping bands 59, 61 on the sections 51, 53 with tightening bolts 63, 65 therein, provide for retaining the members 49, 50 in telescopically adjusted position.

Means is provided in the forward portion of the frame 1 for extending and contracting the top members 49, 50 in response to raising and lowering of said members, whereby to compensate for raising and lowering of the sleeve 33 obliquely, said means being connected to the lower member 9 and to the front sleeve 7 and comprising the following.

A longitudinally, centrally slotted guide bar 67 is fixed to the lower member 9 behind the front sleeve 7 in upstanding position to incline slightly forwardly and has a forwardly curved upper end 69 and an intermediate forwardly extending stud 71, said end 69 and stud 71 being bolted, as at 77, 79, in slots 73, 75 in a pair of upper and lower horizontal studs 81, 83, the stud 81 formed on and extending rearwardly from the front sleeve 7 and the stud 83 being similarly fixed to and similarly extending from the upper end of the lower member 9.

The sections 55, 57 have bifurcated ends, as at 85, straddling the bar 67 with clamping bolts 87, 89 therein extending through the slot 91 of said bar 67 for securing said members 49, 50 in raising or lowered positions.

As will be seen, because the sleeve 33 and rear member 25 on the one hand, and the forwardly and upwardly inclined slot 91 in the guide bar 27, on the other hand, are inclined oppositely, extension and contraction of the members 49, 50 is facilitated when said members are moved upwardly or downwardly. The slot 91 has a forwardly curved upper end 93 in which the bolt 87 may be entered to add support for the upper top member 49 in the highest position of adjustment of said member 49, as shown in FIGURE 2.

From the foregoing, it will be readily apparent, that to increase or reduce the height of the major portion of the frame 1, and at the same time raise or lower the seat 29, it is merely necessary to loosen the bolts 39, 45, 63, 65, 87, 89, raise or lower the top members 49, 50 and then tighten said bolts, and the top members 49, 50 and seat 39 are adjustable to raise or lower the same within a wide range of adjustments between limits of upward and downward movement as shown in FIGURES 1 and 2, respectively. As will also now be clear, the seat carrying sleeve 33 and the rear member 25 are braced in front of and behind the same by the members 49, 50 in different adjusted positions of said members 49, 50, and by the plate 43 and stud 41 when the sleeve 33 is adjusted and so that lateral movement in any direction, of the sleeve 33 and seat 29 is prevented, while the entire frame 1 is well braced between the rear wheel 23 and the front sleeve 7. It will be noted that the frame 1 of this invention may be constructed by adding to the conventional bicycle frame, after cutting off the conventional top members to form the studs 81, 83 and cutting down the conventional seat post supporting member 25, whereby the conventional bicycle frame may be readily converted into a frame according to this invention. This simplifies and expedites the construction of the frame of this invention as will be clear.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a bicycle frame, in combination, a front bearing sleeve for a front wheel fork, a lower frame member extending downwardly and rearwardly from said sleeve, a rear upwardly and rearwardly inclined member rising from said lower member, means on said rear member for supporting a bicycle seat and slidably adjustable obliquely upwardly and downwardly on said rear member into different set positions to raise or lower a seat supported thereon, a top frame member extending forwardly from said means and rigidly secured thereto for adjustment upwardly and downwardly with said means to vary the height of a portion of the frame, and means terminally connecting said top member to said front sleeve and lower member for upward and downward sliding into different set positions, said frame including an upright fender structure for a rear wheel, and brace means slidably connecting said first-named means to said fender structure for guided upward and downward adjustment relative to said fender.

2. The combination of claim 1, said brace means comprising an upright plate fixed on said fender structure and having a slot therein parallel to said rear member, and a member on said first-named means slidable in said slot.

3. In a bicycle, a front bearing sleeve for a front wheel fork, a lower frame member extending downwardly and rearwardly from said front sleeve, a rear upwardly and rearwardly inclined member rising from said lower member, means on said rear member for supporting a bicycle seat and slidably adjustable obliquely upwardly and downwardly on said rear member into different set positions to raise or lower a seat supported thereon, a pair of upper and lower top frame members extending forwardly from said means and rigidly secured thereto for adjustment upwardly and downwardly with said means to vary the height of a portion of the frame, and means terminally connecting said top members to said front sleeve and lower member for upward and downward sliding into different set positions, the last named means including parallel, rearwardly projecting bifurcated studs affixed to said front sleeve and said lower member, a bar including end portions secured between the furcations of said studs, and pin and slot connections securing said top members to said bar.

4. The combination of claim 3, said top members acting to brace said first-named means and diverging forwardly to said last-named means to facilitate bracing action thereof.

5. In a bicycle, a front bearing sleeve for a front wheel fork, a lower frame member extending downwardly and rearwardly from said front sleeve, a rear upwardly and rearwardly inclined member rising from said lower member, means on said rear member for supporting a bicycle seat and slidably adjustable obliquely upwardly and downwardly on said rear member into different set positions to raise or lower a seat supported thereon, a pair of upper and lower top frame members extending forwardly from said means and rigidly secured thereto for adjustment upwardly and downwardly with said means to vary the height of a portion of the frame, and means terminally connecting said top members to said front sleeve and lower member for upward and downward sliding into different set positions, said frame having an upright fender structure for a rear wheel, and brace means slidably connecting said first-named means to said fender structure for guided upward and downward adjustment relative to said fender.

6. In a bicycle, a front bearing sleeve for a front wheel fork, a lower frame member extending downwardly and rearwardly from said front sleeve, a rear upwardly and rearwardly inclined member rising from said lower member, means on said rear member for supporting a bicycle seat and slidably adjustable obliquely upwardly and downwardly on said rear member into different set positions to raise or lower a seat supported thereon, a pair of upper and lower top frame members extending forwardly from said means and rigidly secured thereto for adjustment upwardly and downwardly with said means to vary the height of a portion of the frame, and means terminally connecting said top members to said front sleeve and lower member for upward and downward sliding into different set positions, said last-named means comprising an upright bar on said lower member connected to said front sleeve and to which said top members are terminally slidably connected.

7. A bicycle comprising a frame including a head, a tubular lower member extending downwardly and rearwardly from said head, a tubular inclined member extending upwardly and rearwardly from said lower member, a sleeve mounted for sliding adjustment on said inclined member, a seat adjustably mounted on said sleeve, a fender structure mounted on the rear portion of the frame, a plate mounted on said fender structure, said plate having a slot therein paralleling the sleeve, a bifurcated stud on said sleeve slidably straddling the plate, a bolt in said stud operable in the slot for adjustably securing the sleeve to the fender structure, a pair of upper and lower top bars having one end affixed to the sleeve, said top bars including tubular telescopically adjustable, male and female sections, and means for connecting said top bars at the other ends thereof to the head for vertical sliding adjustment.

8. A bicycle comprising a frame including a head, a tubular lower member extending downwardly and rearwardly from said head, a tubular inclined member extending upwardly and rearwardly from said lower member, a sleeve mounted for sliding adjustment on said inclined member, a seat adjustably mounted on said sleeve, a fender structure mounted on the rear portion of the frame, a plate mounted on said fender structure, said plate having a slot therein paralleling the sleeve, a bifurcated stud on said sleeve slidably straddling the plate, a bolt in said stud operable in the slot for adjustably securing the sleeve to the fender structure, a pair of upper and lower top bars having one end affixed to the sleeve, said top bars including tubular telescopically adjustable, male and female sections, and means for connecting said top bars at the other ends thereof to the head for vertical sliding adjustment, said means comprising a rearwardly projecting, bifurcated stud affixed to the head, a bar having one end secured between the furcations of the second named stud and its other end affixed to said lower frame member, said bar having an essentially vertical slot therein, said male sections including bifurcated free end portions slidably straddling the bar, and bolts in said male sections operable in the second named slot for adjustably securing said male sections to said bar.

References Cited in the file of this patent

UNITED STATES PATENTS

| | | |
|---|---|---|
| 529,861 | Hersh | Nov. 27, 1894 |
| 1,169,381 | Cotton | Jan. 25, 1916 |

FOREIGN PATENTS

| | | |
|---|---|---|
| 684,306 | France | Mar. 17, 1930 |
| 900,078 | France | Sept. 18, 1944 |
| 1,062,770 | France | Dec. 9, 1953 |
| 481,050 | Italy | May 19, 1953 |